Figure 1:
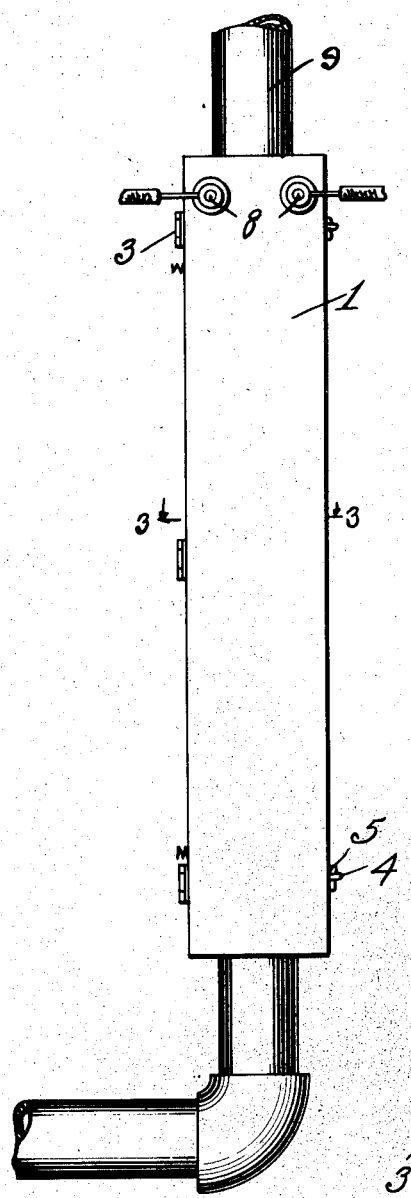

May 6, 1924.

M. P. WEINBACH

ANTIFREEZING DEVICE

Filed Sept. 29, 1922

1,492,821

Inventor
Mendel P. Weinbach.

By Richard B. Owen
Attorney

Witnesses

Patented May 6, 1924.

1,492,821

UNITED STATES PATENT OFFICE.

MENDEL P. WEINBACH, OF COLUMBIA, MISSOURI.

ANTIFREEZING DEVICE.

Application filed September 29, 1922. Serial No. 591,340.

*To all whom it may concern:*

Be it known that I, MENDEL P. WEINBACH, a citizen of the United States, residing at Columbia, in the county of Boone and State of Missouri, have invented certain new and useful Improvements in Antifreezing Devices, of which the following is a specification.

The present invention relates to an antifreezing device having for its principal object to provide means which may be readily attached to a pipe or the like for preventing the freezing of water contained therein. This device is especially useful on the cooling systems of automobiles during the winter but of course, may be used for numerous other purposes.

Another important object of the invention is to provide a device of this nature which will be simple and efficient in construction, reliable in operation, durable, comparatively inexpensive to manufacture, readily attached to and removed from a pipe, and well adapted to the purpose for which it is designed.

Figure 2:
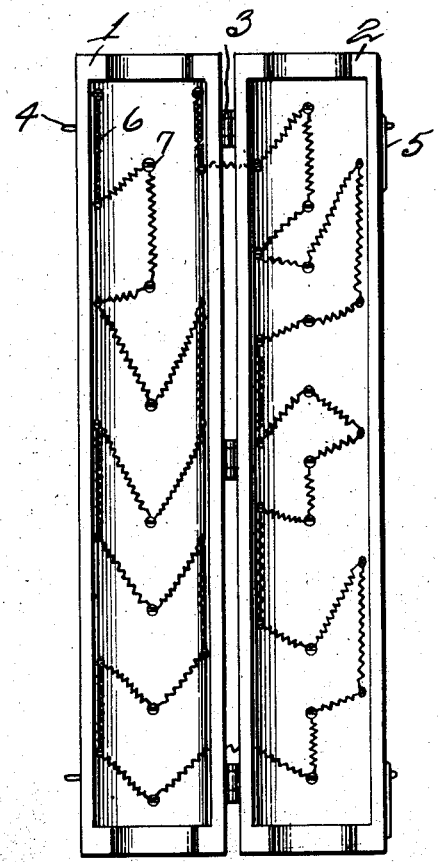
Figure 3:
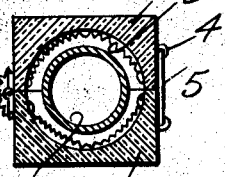

In the drawings:

Figure 1 is an elevation of the device showing the same in a closed position upon a pipe, Figure 2 is an elevation showing the device in an open position, and Figure 3 is a section taken substantially on the line 3—3 of Fig. 1.

Referring to the drawing in detail, it will be seen that the device is constructed with a box like formation formed in two sections 1 and 2 which are hinged together at 3. This box like structure is formed of heat retaining, nonelectrical conducting material such as an asbestos composition. Suitable means are provided for holding the box like structure in a closed position and in the present illustration this is accomplished by having eyes 4 on the sides of the section 1 and the hooks 5 on the free side of the section 2. A heating electric coil wire 6 is arranged in zig zag manner throughout the two sections 1 and 2 on the interior thereof, being held close to the surface by a plurality of screws or like devices 7. Suitable terminals 8 are provided on the section 1 for receiving the ends of this coil wire 6 so that the same may be connected to any suitable source of electrical energy. The box like structure is mounted about the pipe 9 and of course when the current is turned on, sufficient heat will be generated within the box like structure so as to prevent water from freezing within the pipe 9.

Having thus described my invention what I claim is:—

1. A device of the class described comprising a box-like structure having its ends apertured and formed in a pair of sections, heating means in both of the sections, means for hinging the sections together and means for holding the sections in a closed position.

2. A device of the class described comprising a box like structure formed with apertured ends and in two sections, means for hinging the two sections together, means for holding the two sections in a closed position, and electrical heating means disposed within the box like structure.

3. A device of the class described comprising a box like structure having apertured ends and formed in a pair of sections, means for hinging the sections together, means for holding the sections in a closed position, a coiled wire disposed within the box like structure in a zig zag manner, and means for holding the wire close to the inner surface of the box like structure.

4. A device of the class described comprising a box like structure having apertured ends and formed in a pair of sections, means for hinging the sections together, means for holding the sections in a closed position, a coil wire disposed within the box like structure, screws holding the coil wire in a zig zag manner adjacent the inner surface of the box like structure and terminals on one of the sections for receiving the ends of the coil wires so as to connect the same with any suitable source of electrical energy.

In testimony whereof I affix my signature in presence of two witnesses.

MENDEL P. WEINBACH.

Witnesses:
NANCE PRYOR,
FANNIE HICKMAN.